PUNCH

Filed June 16, 1948

INVENTOR.
WALTER F. KELLEY
BY Robert H. Strother
ATTORNEY

July 29, 1952 W. F. KELLEY 2,604,944

PUNCH

Filed June 16, 1948 5 Sheets-Sheet 2

INVENTOR.
WALTER F. KELLEY
BY Robert H. Strother
ATTORNEY

July 29, 1952 W. F. KELLEY 2,604,944

PUNCH

Filed June 16, 1948 5 Sheets-Sheet 3

*INVENTOR.*
WALTER F. KELLEY
BY Robert H. Strother
ATTORNEY

July 29, 1952

W. F. KELLEY 2,604,944

PUNCH

Filed June 16, 1948

5 Sheets-Sheet 4

*INVENTOR.*
WALTER F. KELLEY
*BY* Robert H. Strother
ATTORNEY

INVENTOR.
WALTER F. KELLEY
BY Robert H. Strother
ATTORNEY

Patented July 29, 1952

2,604,944

UNITED STATES PATENT OFFICE 2,604,944

PUNCH

Walter F. Kelley, Whitestone, N. Y., assignor to Remington Rand, Inc., New York, N. Y., a corporation of Delaware Application June 16, 1948, Serial No. 33,366

4 Claims. (Cl. 164—115)

This invention relates to improvements in record card perforating machines, viz., automatic key punches, and more particularly to improvements in the controlling circuits of automatic key punches when controlled by record media such as perforated paper tapes.

The controlling of key punch machines by tape records to punch statistical data in record cards is well known to the art. Examples of this type of punch control are seen in Carroll 1,976,600, granted October 9, 1934; W. F. Kelley, 2,160,152, grantedMay 30, 1939; Lasker and Kelley, 2,172,754, granted September 12, 1939; Nelson and Johnson, 2,183,820, granted December 19, 1939; and in Doty et al., 2,340,801. Statistical data is recorded in a card in the form of coded perforations by means of a punch similar to that disclosed in the patent to Lasker, 2,124,178, granted July 19, 1938, or in Lee and Daly, 1,976,618, granted October 9, 1934. Normally, this punch is manually controlled by an operator on the keyboard provided therefor. However, in certain installations it is desirable to provide means for automatic key punch operation under the control of preperforated records, such as paper tapes. The coded perforations in said tapes are sensed in a tape reader, and the signals therefrom actuate mechanisms that, in turn, control card punching operations. Therefore, it is necessary to provide for the disabling of the tape feeding mechanism whenever said punching operations required any greater amount of time for completion than a normal character punching operation, i. e., for example, a "trip" operation on the Lasker punch requires a tape feeding delay sufficient to enable the die to gang punch a card, eject said card from the punching chamber, feed a new card therein, and return the carriage to a left hand margin position. The time interval, from tape to card, is of prime importance, and with the removal of the human element, this interval decreases to a minimum requirement. Efficiency of operation then depends upon the amount of mechanical malfunction occurring and the productive speed of the apparatus concerned. It is toward these combinations that the invention appertains. The improved system results in increased speed and accuracy of card punching.

The principal object of the invention resides in the provision whereby means under the control of the punch determines the delay necessary for punch machine operations and interrupts tape feeding in the tape reader accordingly.

Another object is to provide means to stop tape feeding in the tape reader when a malfunction occurs in any card punching operation.

A still further object is the provision of an improved means to stop tape feeding when no card is present in the die chamber, indicating that either the supply of cards in the punch magazine is exhausted or a malfunction of the card feeding mechanism has occurred.

Other ancillary objects and structural details of the present invention will be apparent from the following description when read in connection with the following drawings, wherein.

Figure 1:
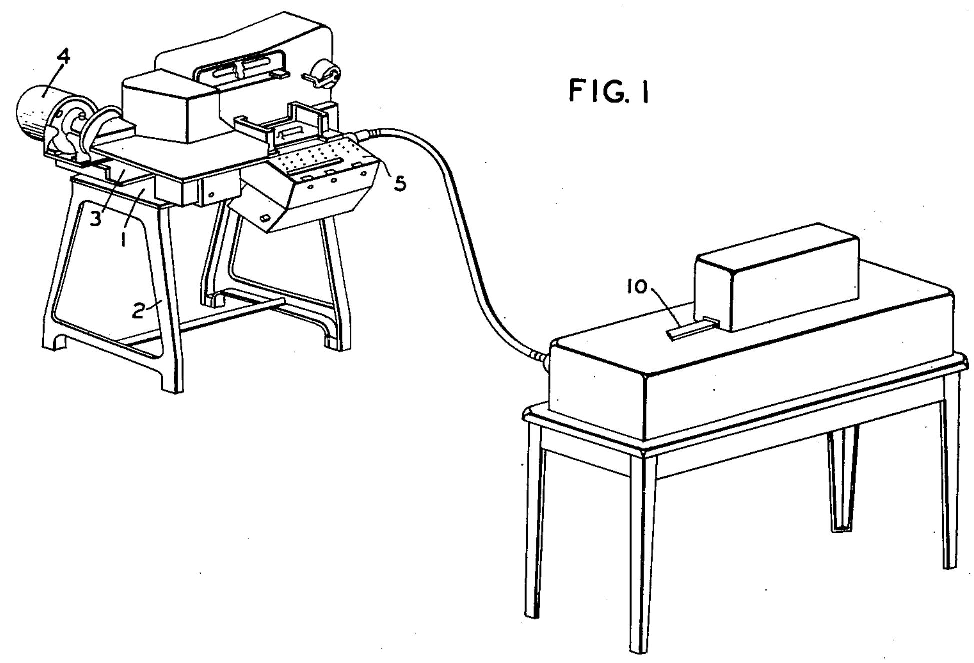
Fig. 1 is a view in isometric projection of the card punch and tape translator.

As the invention relates to improvements in the control circuits of the card punch system disclosed in Patent 2,160,152 to W. F. Kelley, a brief description of the punch mechanisms follows to facilitate understanding of the invention.

*Punch operation*

In order that the improvements in the punch may be readily understood, a brief description of punch operations follows:

The automatic punch perforates a card by gang punching. The card is fed by a picker knife into a set of feed rolls which then carries the card into a punching chamber between the upper and lower die plates. The upper die plate assembly comprises forty-five horizontal columns of punch gag members in twelve longitudinal rows. Above the die plate assembly is a carriage bearing a number of gag setting elements equal in number to the longitudinal rows of punch gag members. The setting elements are actuated by solenoids connected thereto by a Bowden wire system. It will be seen that any punch gag member in a column may be depressed by the corresponding setting element on the carriage. The carriage is then moved forward, and the setting elements again operated to select and depress a punch gag member or members of another column. The spacing of the carriage from column to column is automatic with each gag setting operation. However, an independent solenoid, when actuated, will space the carriage without depressing any punch gags. This operation is customarily used to move the carriage one or two columns at a time. Should it be necessary to space the carriage several columns, a skipping mechanism actuated by another independent solenoid may be employed. Thus the desired punch gags throughout the travel of the carriage are selected and depressed. A latching mechanism holds the punch gags depressed until released by a retract mechanism. At this time the upper and lower die plates, comprising the card chamber, are elevated, moving the card against the depressed punch gags and perforating same. The chamber descends to its normal position, the card is ejected and a new card is fed once more to the punch chamber. To provide flexibility of card punching several differing operations may be employed.

A "carriage return" may be initiated that will return the carriage to a desired leftward position without retracting the already depressed punch gags.

A "card with carriage return," likewise, may be initiated that will return the carriage as above and, in addition, punch a card, eject that card and insert a new one in the chamber.

A "card" operation consists in punching the card, ejecting that card and inserting a new one into the punch chamber without moving the carriage or retracting any punch gags.

A "trip" operation consists in punching the card, ejecting the card and inserting a new card into the punch chamber. Also, this operation returns the carriage to the left hand margin stop and retracts the prior punch gag pattern.

A "trip-intermediate" operation is similar to the "trip," except that the carriage returns to an intermediate margin stop.

A "back-space" operation moves the carriage back one column.

A "cancel" operation returns the carriage to the margin stop, releasing the depressed punch gags as the carriage returns.

An "erase" operation releases depressed punch gags in individual columns and automatically spaces the carriage one column.

To control the hereinbefore described operations, the tape reading mechanism effects the closing of electrical contacts when the particular representative perforation pattern has been sensed in the tape. These closed contacts establish primary circuits that will energize one or more of a plurality of multicontact relays. The contacts closed by the energized relay or relays and certain machine operations of the punch establish secondary circuits that effect the mechanisms in the tape reader of the automatic punch and control the tape feeding mechanism.

The punch is mounted on a main frame 1 (Fig. 1) which is supported by legs 2 to provide a comfortable operating height for the keyboard operator. Mounted on the main frame 1 is another frame 3 upon which is mounted a motor driven generator 4. Driven from speed reduction mechanism 8 (Fig. 3) and mounted on short shaft 11 are clutches 12, 14, and 15, clutch 12 being for back space, clutch 14 for carriage return, and clutch 15 for driving shaft 16, the axis of which is directly in line with shaft 11, and upon which there are mounted the several driving members for the various punch operating mechanisms, such as that for card feeding, the card picker knife, the die for actual punching operations, the card stop, and the commutator which controls certain of the punch actuating functions.

The keyboard 5 provides manually operative means for completing circuits for selectively setting punches and controlling machine operations. Keyboard 5 is wired through a terminal strip 6 (Fig. 3) that also provides for external electrical connections when controlling the punch by means other than keyboard 5. Switching means 5A on keyboard 5, when actuated, disables said keyboard and permits circuit control from said external sources through terminal strip 6, as is required when tape record mechanisms are employed to operate the punch.

As shown in Fig. 1, a tape translator having a tape reading mechanism therein is utilized to control the card punch. A preferred illustration of the invention concerns the tape reading mechanism revealed in Patent 2,160,152 to Kelley. However, it is understood that any conventional tape reading mechanism could be employed to control said punch. The fundamentals necessary in a tape reading device are: a tape feeding mechanism, sensing pins to probe apertures or perforations in a tape 10, code bars responsive to the selected findings of the sensing pins, electrical contacts opened and closed by the actuation of the said code bars, and driving means to actuate said tape reading device.

The driving mechanism for the tape reader in the cited patent has been altered to incorporate a positive control feature in the form of an electromagnetic device which, in turn, is controlled by certain circuit improvements in the card punch.

Figure 2:
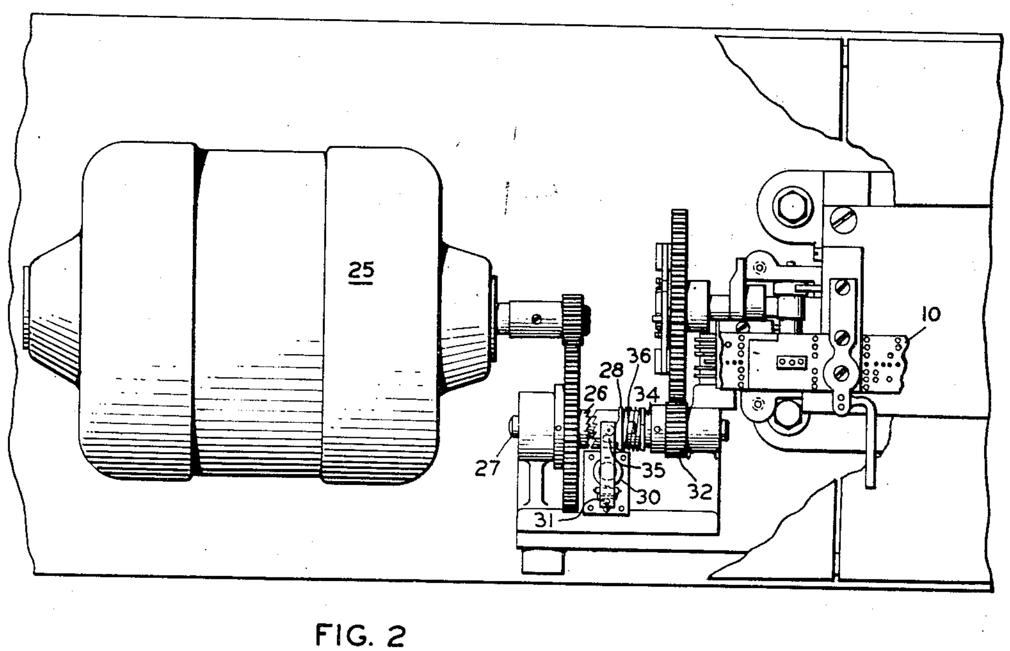
Fig. 2 is a plan view of the tape mechanism illustrating the driving means and control therefor.

The electromagnetic device 30 (Fig. 2) is responsive to the actuation of various mechanisms, hereinafter described, in the card punch, and controls the tape reading mechanism accordingly. As shown in Fig. 2, a conventional motor 25, through speed reduction gearing, shaft 27, clutch 26, and gear 32 drives the tape feeding and reading mechanisms. These tape mechanisms are so thoroughly and completely described in Patent 2,160,152 to Kelley that it is deemed unnecessary to repeat their functions. It may be said that these mechanisms cannot operate if clutch 26 is disengaged. The construction and operation of clutch 26 is as follows:

The driving jaw of said clutch is secured to shaft 27 to which the speed reduction gearing is attached. The driven jaw of said clutch is secured to a sleeve 34 which rotates on shaft 27. Clutch 26 is urged by spring 36 into engagement, thereby imparting motion to sleeve 34. Also secured to sleeve 34 are gear 32, which drives the tape mechanisms, and a collar 28, which coacts with electromagnet 30 to disengage clutch 26 after one revolution. Secured to collar 28 are two identically formed camming members 35, diametrically located with respect to each other, one of which is engaged by a protrusion on armature 31 when electromagnet 30 is energized. When so engaged the camming surface of said member cams collar 28 rightward, disengaging clutch 26. With said clutch disengaged, the protrusion on armature 31 engages a latching portion of collar 28, arresting the rotation of sleeve 34.

As electromagnet 30 is deenergized, armature 31 and the protrusion thereon are spring urged upwards away from collar 28, thereby permitting spring 36 to instantly restore clutch 26 to an engaged position. With motion again imparted to sleeve 34 and gear 32, the tape mechanisms resume punch controlling operations.

As disclosed in Fig. 32 of Patent 2,160,152 to W. F. Kelley, the card relay 349 is energized at the start of a "card" operation and, by means of a holding circuit for said relay, remains energized until the completion of said operation. In an analogous manner, "skip" relay 335, "card-carriage return" relay 352, "trip" relay 363, and "trip-intermediate" relay 326 are held energized until each respective operation has been completed.

To provide a means for tape feed disabling during each of the above operations, an additional pair of contacts (see Fig. 7) has been mounted on each relay. These pairs of contacts 53, 54, 55, 57 and 59, normally open, are closed when the related relay is energized.

The fixed contact of pair 53 is connected in parallel with the fixed contact of each of the pairs 54, 55, 57 and 59, through conductor 115 to negative terminal post 116 on connector strip 6. The swinging contact of pair 53 is connected in parallel with each of the swinging contacts in pairs 54, 55, 57 and 59, through a conductor 122 to neutral terminal post 118 on strip 6. Literally, these pairs of contacts are in parallel with respect to each other, but individually are in series with the electromagnetic control circuit. From neutral terminal post 118 the circuit continues through conductor 122 to the coil of electromagnet 30, through said coil and conductor 120 to positive voltage terminal post 117 on connector strip 6. Positive terminal post 117 and negative terminal post 116 are, respectively, connected to the positive and negative poles of generator 4. The closure of any pair of the above contacts establishes a conducting path for electrical current to flow through electromagnet 30, thereby energizing same.

*Carriage return*

Figure 3:
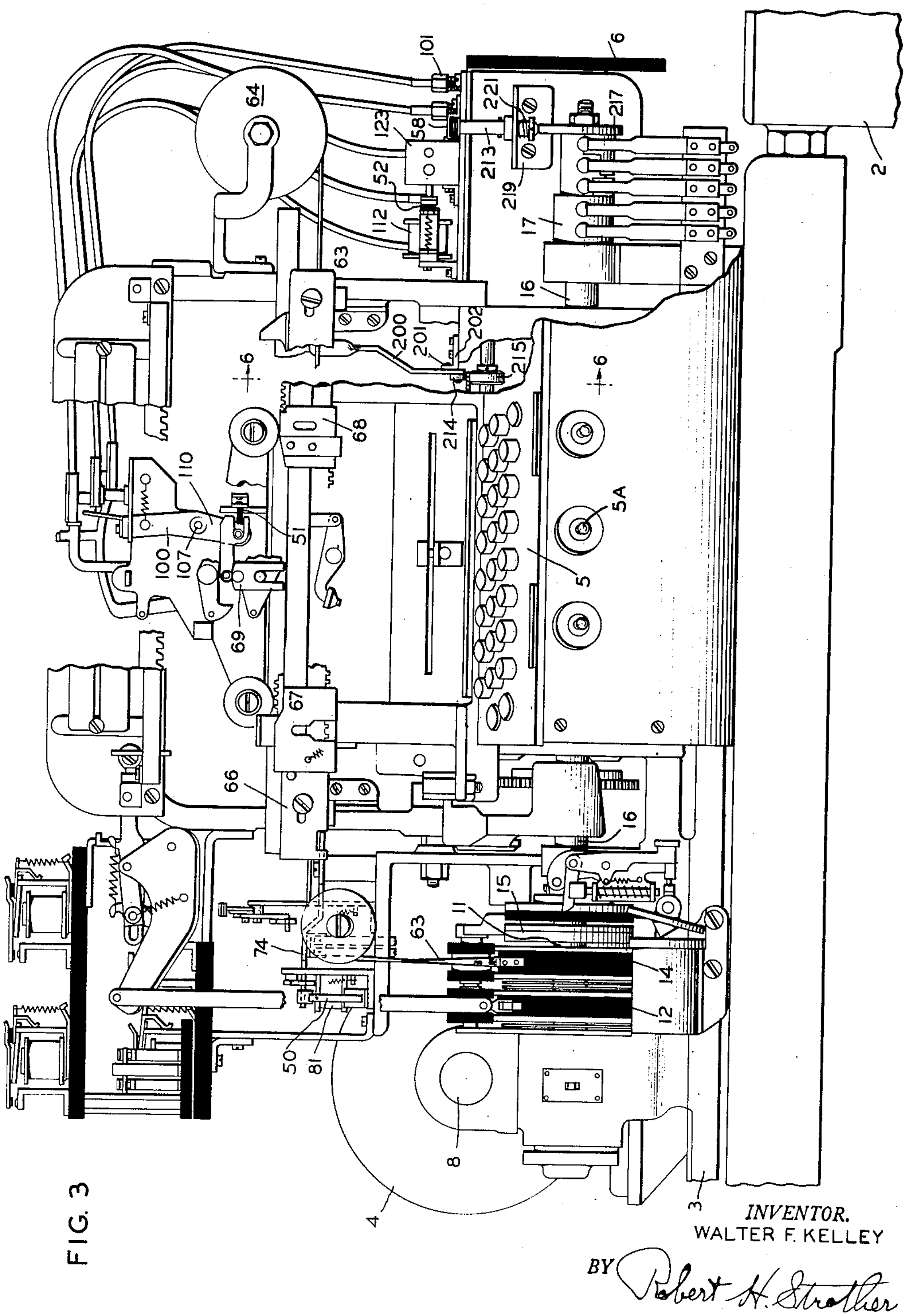
Fig. 3 is a front elevation of the card punch showing the improvements thereon.
Figures 4, 6:
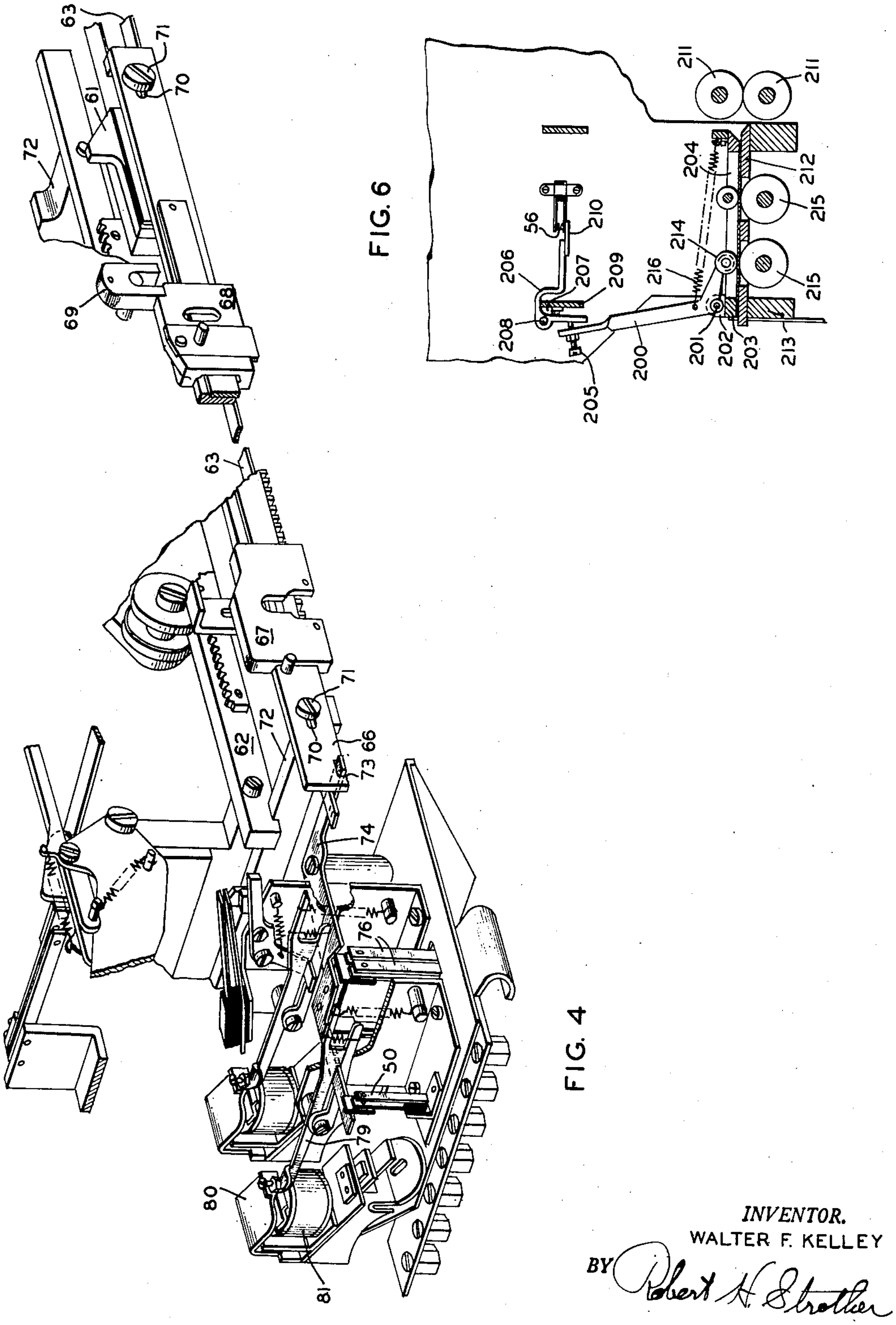
Fig. 4 is an isometric view of the carriage return mechanism and control contacts closed thereby.
Fig. 6 is a sectional view of the no-card-in-die-mechanism taken along lines 6—6 of Fig. 3.
Figure 7:
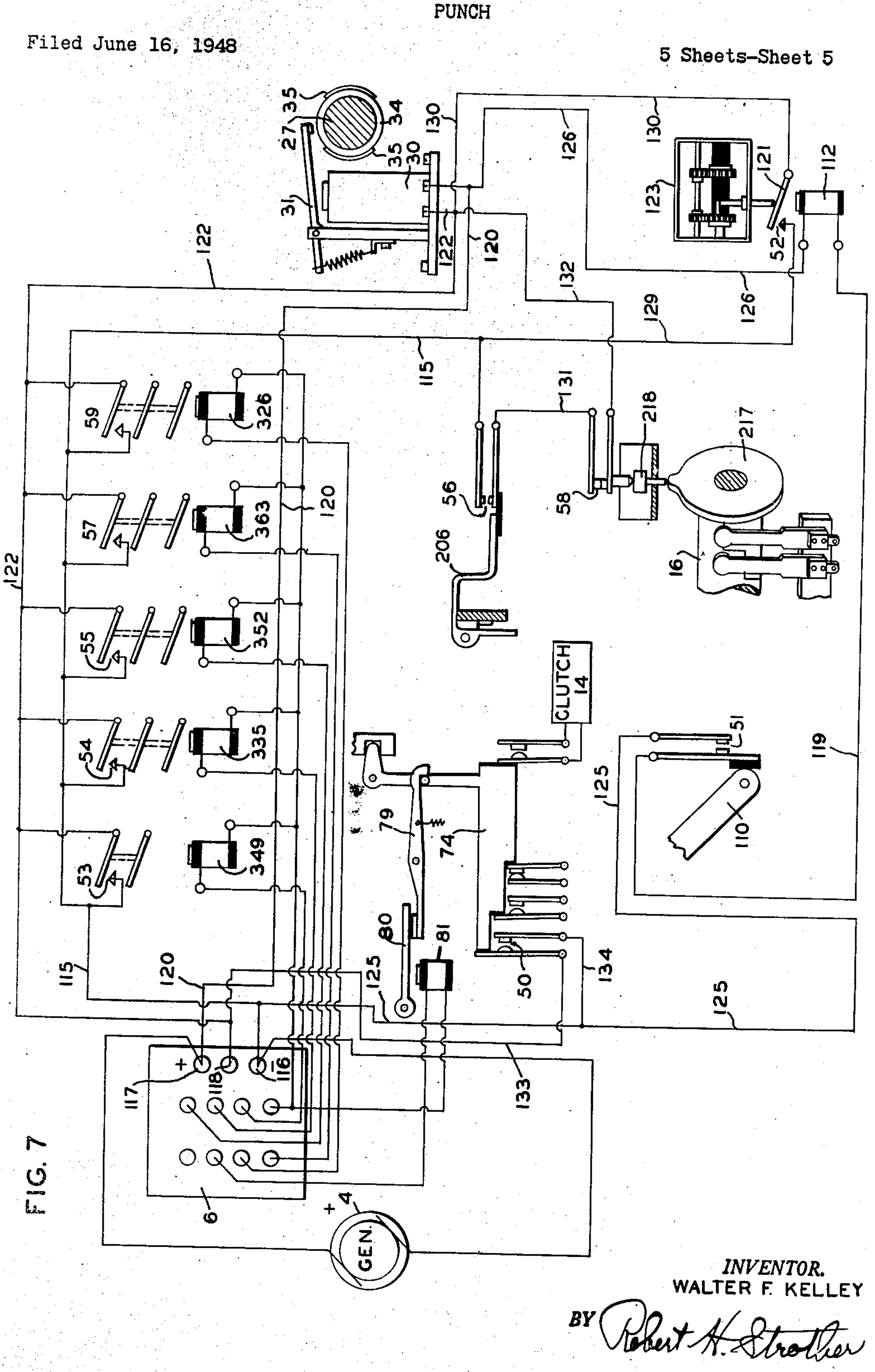
Fig. 7 is a wiring diagram of the control circuit for controlling the electromagnetic device for the tape feeding mechanism.

Electromagnet 30 is energized during a carriage return operation by the closure of normally open spring contacts 50 (Figs. 3, 4, and 7). Said contacts are connected in parallel with the hereinbefore described contacts 53, 54, 55, 57 and 59 and, therefore, are in series in the electromagnet control circuit. The carriage returning mechanism which effects the closing of contacts 50 is as follows:

A hook member 61 is provided for returning the carriage, which is carried on a rod member parallel with the rack bar 62 (Fig. 4). Secured to hook member 61 is a tape 63, one end of which is attached to a drum spring 64 (Fig. 3), the other end of which passes over a pulley 65 and is attached to the carriage return magnetic clutch 14. Except for the interval that a carriage return operation is in progress, hook member 61 resides at the right hand extremity of its supporting rod due to the influence of drum spring 64. When, however, it is desired that the carriage be returned to a margin stop, a signal on tape 10 will actuate the tape reading mechanism, causing a circuit to be established that momentarily energizes magnet 81 (Fig. 4). With said magnet energized, the armature 80 is attracted thereto, actuating latch lever 79, the raising of which allows the leftwardly extending arm of lever 74 to swing forward, closing certain contacts of group 76 and opening others, those closed energizing the carriage return magnetic clutch 14. Also, the forward movement of lever 74 closes contacts 50, energizing electromagnet 30. The circuit for electromagnet 30 extends from negative terminal 116, through conductors 125, 134, contacts 50, conductors 133, 122, the winding of magnet 30, conductor 120 to the positive terminal 117. Tape 77 is pulled downward by clutch 14, drawing hook member 61 leftward into engagement with the carriage, thereby pulling said carriage from right to left.

To control the returning carriage, there is provided a control bar 66, as is shown in Fig. 4. The bar 66 has thereon two adjustable stop members, a left hand margin stop 67, and an intermediate stop member 68. These stops cooperate with an adjustable block member 69 which is mounted on the carriage. The control bar 66 is slidably mounted on mounting screws 71 secured to frame members 72. Slots 70 permit limited movement of bar 66. At the left extremity of said bar there is a notch 73 which engages the forward arm of lever 74. The forward movement of the leftwardly extending arm of lever 74, hereinbefore described, actuated contacts that energized clutch 14. Therefore, when carriage block member 69 engages one of the stop members 67, 68, the bar 66 moves to the left, rotating the forwardly extending arm of lever 74. The other arm of lever 74 moves rearward under latch lever 79, opening the clutch energizing contacts 50. The latching of lever 74 signifies the end of a carriage return operation by opening contacts 50, which results in the deenergizing of electromagnet 30 and subsequently, resumption of tape controlled operations.

*Universal bail mechanism*

Figure 5:
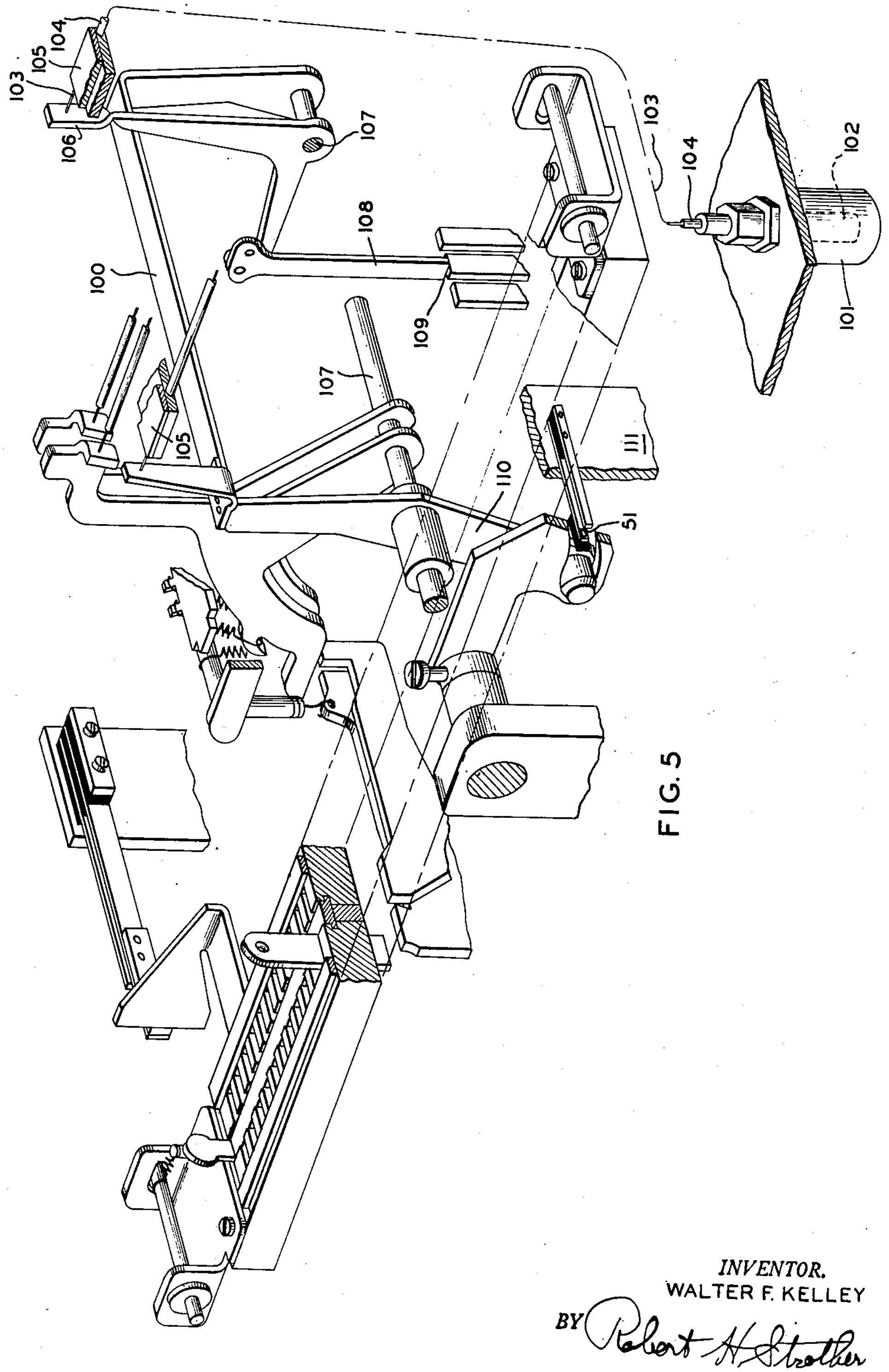
Fig. 5 is an isometric view of the universal space bail, mechanisms associated therewith, and control contacts closed thereby.

In normal character punching, alphabetical or numerical, the sensing of such a signal on tape 10 actuates the tape reading mechanism to establish a related circuit through terminal strip 6 to energize the related solenoid 101. Said solenoid 101, one of a plurality of solenoids (Figs. 3 and 5), when energized, actuates plunger 102 to move Bowden wire 103 through flexible casing 104, which terminates in an anchor plate 105 mounted on the carriage. Wire 103, free to move through said anchor plate, abuts against one of a plurality of set bar levers 106, rocking same counterclockwise on shaft 107. Set bar 108 pivotally secured to set bar lever 106 then moves downward, and engages one of a plurality of punch setting members 109 which is locked in its effective position by latching means (not shown), and remains so until released by the retract mechanism. A universal bail 100 pivotally mounted on shaft 107 is simultaneously actuated during a set-up by set bar lever 106 abutting against said bail. Deenergizing of solenoid 101 returns wire 103 and, subsequently, set bar lever 106, and bail 100, to their original positions. An arm 110 of bail 100 actuates the spacing mechanism on said bail's return movement, and advances the carriage one space in preparation for a set-up in the succeeding column.

The above description, although brief, is intended to point out the fact that the bail 100 is actuated during each set-up and spacing operation. A pair of normally open contacts 51 (see Figs. 3, 5, and 7) is mounted on a frame 111 of the carriage, with the ends thereof lying in the path of travel of arm 110 of bail 100. Each movement of bail arm 110 closes contacts 51 and establishes an electrical circuit that energizes time delay relay 112. This circuit extends from negative terminal 116, over conductor 125, through contacts 51, conductor 119, winding of delay relay 112, conductors 126 and 120, to the positive terminal 117, thus operating the delay relay 112. The armature 121 of relay 112 effects the closing of a normally open pair of contacts 52 that is integral with the tape feed electromagnet control circuit. Electromagnet 30 is operated over the following circuit: from negative terminal 116, conductors 115 and 129, contacts 52, conductor 130, winding of electromagnet 30, over conductor 120, to the positive terminal 117, thus operating the magnet 30 to stop tape feed. As may readily be seen, each set-up and spacing operation would intermittently disable the tape feeding mechanism. Therefore, a delayed action mechanism is provided to prevent contacts 52 from closing each time that relay 112 is energized. This is accomplished by a conventional mechanical delay mechanism 123 secured to armature 121 of relay 112. The time required to perform a set-up operation is approximately .015 second. Therefore, a time delay of .018 was arbitrarily chosen as the operating time for the delay mechanism 123. During normal punching operations, the advancement of tape 10 one space is concomitant with each punch set-up, and disabling of the tape feeding mechanism is not desired. However, should a malfunction occur and bail 100 fail to return to its inoperative position within .018 second, the delay mechanism 123 will have traveled through its time delay sequence, closing contacts 52, thereby completing the circuit to the tape feed electromagnet 30. The tape feeding mechanism remains disabled until the cause of the malfunction is found and the condition corrected, thus permitting restoration of bail 100 and opening of contacts 52.

Prior to the invention, the tape feeding mechanism continued to operate until stopped by an operator. This, of course, required the restarting of the tape at its beginning, since there was no method available for identifying on the tape where said malfunction of the punch occurred and, therefore, necessitated the continued presence and alertness of the supervising operator. In addition, the cards already punched had to be discarded to prevent superfluous duplication.

*No-card-in-die-mechanism*

At the completion of a punching operation, i. e., any operation whereby a card is punched and ejected, a fresh card must be fed into the punching chamber in preparation for subsequent set-ups and punching. Failure of a card to feed through a malfunction of the card feeding mechanism, or the exhaustion of the supply of cards, would effect an undesirable condition in that tape 10 would advance without a record of the information in said tape being reproduced in a card. To prevent this undesirable feature, a no-card-in-die-mechanism disables the card feeding mechanism in the absence of a card in the punch chamber. As shown in Figs. 3, 6, and 7, the no-card-in-die-mechanism consists of a bell-crank 200, pivotally mounted on a stud 201, secured to bracket 202 fast on upper die plate 203. A pressure roll 214, pivotally mounted on the forwardly extending arm of bell-crank 200 passes through a slot 204 in the upper die plate 203. The upper arm of bell-crank 200 has thereon an adjustable screw 205 that coacts with the lower arm of a second bell-crank 206, which is pivotally mounted on a stud 208 in a bracket 207. Bracket 207 is secured to a cross member 209 of the set bar basket. The forwardly extending arm of bell-crank 206 has thereon an insulated camming member 210 that rests against one spring of a normally open pair of contacts 56. A card passing through feed rolls 211 enters between the upper die plate 203 and lower die plate 212, and continues until arrested by card stop 213. Pressure roll 214 now rests on the surface of the card. However, after the card is punched and card stop 213 opens, the card moves rearwardly (to the left in Fig. 6) under the influence of skid rolls 215 and pressure rolls 214, and is ejected from the punching chamber. As the trailing card edge passes under roll 214, spring 216 urges bell-crank 200 clockwise a distance equal to the thickness of a card. Set screw 205 on the upper arm of bell-crank 200 coacts with the lower arm of bell-crank 206, rocking the latter bell-crank counter-clockwise. Insulated member 210 on the forward arm of bell-crank 206 closes contacts 56. Contacts 56 are one of the seven pairs previously described that control electromagnet 30, the energizing of which disables the tape feeding mechanism. The circuit for magnet 30 in this instance is traced from negative terminal 116, conductor 115, through contacts 56, conductor 131, through contacts 58, conductor 132, 122, winding of magnet 30, over conductor 120 to the positive terminal 117, thus operating the magnet 30.

The clearing of the malfunction or the replacement of a supply of cards by the operator, and the subsequent insertion of a card into the punch chamber, will cam roll 214 upward, pivoting bell-crank 200 counter-clockwise, releasing the pressure of set screw 205 on bell-crank 206, allowing same to rotate clockwise under the influence of the spring contact, thereby opening contacts 56. Electromagnet 30 (Fig. 7) is then deenergized and tape controlled operations are resumed. In effect, the no-card-in-die-mechanism amplifies the thickness of a card, a sufficient amount to open and close contacts 56.

During normal card feeding operation there is a period when there is a space between cards, thus permitting roll 124 to drop and close the contacts 56, which would result in the energization of electromagnet 30. To prevent this operation a cam 217 mounted on main shaft 16 controls a pair of intermediate contacts 58 which are in series with contacts 56. This cam is formed to maintain contacts 58 open during the time interval in which roll 124 drops into a normal space between cards.

The cam 217 cooperates with an interponent 218 (Fig. 3) which is supported by bracket 219 secured to a side plate of the solenoid container 220. A spring 221 urges said interponent downward against cam 217 and, when shaft 16 is rotating, allows contacts 58 to open. Said contacts are mounted on the top side of solenoid container 220. Contacts 58 are closed only when shaft 16 is at rest, or in approximately zero degrees position. When a new card fails to feed, contacts 56 are closed and shaft 16 continues through one revolution. As shaft 16 reaches approximately 360° of said revolution, interponent 218 is cammed upwards by the high dwell on cam 217, and contacts 58 are closed, thereby completing the energizing circuit for electromagnet 30.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a tape controlled statistical card punch system, a punch mechanism including a carriage, a space bail mechanism associated with said carriage; a primary circuit including a power source, a delayed action relay, and a primary switching means; a secondary circuit, including a power source, an electromagnetic device and secondary switching means; a tape; a tape feeding mechanism responsive to said electromagnetic device; said bail being adapted to momentarily actuate said primary switching means to energize said delayed action relay momentarily, said momentary action of said relay being ineffective to actuate said secondary switching means and said bail being adapted to continue actuation of said primary switching means to continue energization of said delayed action relay on malfunctioning causing undue delay to close said secondary switching means and energize said electromagnetic device to disable said tape feeding mechanism.

2. In a tape controlled statistical card punch system, a punch mechanism including a card feeding device, a plurality of feed rollers, a drive shaft therefor and a punching chamber; a card exhaustion indicator comprising a first pivotally mounted bell-crank, a roller journalled on one arm thereof, a second pivotally mounted bell-crank, one arm of which is operatively engaged by adjustable means mounted on the other arm of said first bell-crank, a pair of contacts actuable by the other arm of said second bell-crank, spring means for urging said roller into engagement with one of said feed rollers; a second pair of contacts; an electromagnetic device; a tape feeding mechanism responsive to said electromagnetic device; a circuit connecting in series said first and second pairs of contacts, a power source and said electro-magnetic device; a cam mounted on said drive shaft for closing said second pair of contacts at a certain time in the machine cycle; whereby the momentary absence of a card in said punching chamber results in a momentary inconsequential closing of said first pair of contacts; and the continuous absence of a card results in a prolonged closing of said first pair of contacts extending into the said certain time when said second pair of contacts are closed to thereby complete said circuit and energize said electro-magnetic device to disable said tape feeding mechanism.

3. In a tape controlled statistical card punching system including a card punching mechanism, a punch setting carriage, a bail mechanism associated with and effective when normally momentarily actuated to space said carriage, a tape feeding mechanism, and a power source; the combination of controlling means operable to disable said tape feeding mechanism; a circuit including said power source, a relay and a switching means responsive to the actuations of said bail mechanism for completing the circuit to energize said relay; another circuit including said power means, said controlling means, and another switching means responsive to said relay for completing the second mentioned circuit to operate said controlling means of the tape disabling mechanism; and means operative to render the second mentioned switching means unresponsive to momentary energizations of said relay as effected by normal actuations of said bail mechanism and responsive to continuous energizations of said relay as effected by abnormally long actuations of said bail mechanism to actuate the disabling of the tape feed mechanism.

4. In a tape controlled statistical card punching system including a punch mechanism having a punching chamber, card feeding means, and means normally operative for conveying cards seriatim through said punching chamber; a tape feeding mechanism and a power source; the combination of controlling means operable to disable said tape feeding mechanism; card engaging means located in said card chamber; a series circuit connecting said power source, said controlling means, and dual switching means; one of said switching means being adapted to close upon non-engagement of a card by said card engaging means; means operative to close the other of said switching means at a time during the engagement by said engaging means of each normally conveyed card; and the concomitant closing of said dual switches as during the non-conveyance of cards for an abnormal time being effective to complete said circuit and thereby operate the said controlling means.

WALTER F. KELLEY.

REFERENCES CITED

The following references are of record in the file of this patent:

UNITED STATES PATENTS

| Number | Name | Date |
|---|---|---|
| 1,870,230 | Bolt | Aug. 9, 1932 |
| 1,950,476 | Bryce | Mar. 13, 1934 |
| 2,160,152 | Kelley | May 30, 1939 |
| 2,224,764 | Dickinson | Dec. 10, 1940 |
| 2,340,801 | Doty | Feb. 1, 1944 |